(12) United States Patent
Tachibana

(10) Patent No.: US 7,881,705 B2
(45) Date of Patent: Feb. 1, 2011

(54) MOBILE COMMUNICATION TERMINAL AND INFORMATION ACQUISITION METHOD FOR POSITION SPECIFICATION INFORMATION

(75) Inventor: Makoto Tachibana, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 722 days.

(21) Appl. No.: 11/822,465

(22) Filed: Jul. 6, 2007

(65) Prior Publication Data

US 2008/0045191 A1  Feb. 21, 2008

(30) Foreign Application Priority Data

Aug. 17, 2006  (JP) ............................. 2006-222354

(51) Int. Cl.
  *H04M 3/42* (2006.01)
(52) U.S. Cl. .................................. 455/414.2
(58) Field of Classification Search ............... 455/414.2
  See application file for complete search history.

(56) References Cited

U.S. PATENT DOCUMENTS 5,946,687 A    8/1999  Gehani et al.
2008/0045191 A1*  2/2008  Tachibana ................. 455/414.2

FOREIGN PATENT DOCUMENTS

| EP | 0 908 835 A | 4/1999 |
|---|---|---|
| EP | 1 267 146 A | 12/2002 |
| JP | 07-182374 | 7/1995 |
| JP | 11-045248 | 2/1999 |
| JP | 2002-049684 | 2/2002 |
| JP | 2003-228532 | 8/2003 |
| WO | WO-2004/076977 A | 9/2004 |
| WO | WO-2006/032962 A | 3/2006 |

OTHER PUBLICATIONS

Japanese Office Action dated Apr. 16, 2008 for corresponding Japanese Application No. 2006-222354.
European Search Report dated Feb. 6, 2008 for corresponding European Application No. EP 07 25 2815.

* cited by examiner

*Primary Examiner*—William D Cumming
(74) *Attorney, Agent, or Firm*—Rader, Fishman & Grauer PLLC

(57) ABSTRACT

There is provided a mobile communication terminal including an information storage unit having registered therein a plurality of registration names and position specification information data with which at least a position can be specified which are correlated respectively; an instruction input unit for acquiring instruction input from a user; an information extraction unit for extracting position specification information required for receiving a desired information service; an information communication unit for transmitting the position specification information extracted by the information extraction unit to an information service provider side; an information presentation unit for presenting information in a form which can be recognized by the user; and a received information presentation control unit for causing the information presentation unit to present the information returned from the information service provider side and received by the information reception unit.

10 Claims, 10 Drawing Sheets

FIG. 6

| | CHANGE GUIDANCE (FROM HOME) | CHANGE GUIDANCE (EXCEPT REGISTERED PLACE) | LAST TRAIN GUIDANCE | NEARBY MAP | WEATHER INFORMATION | ... |
|---|---|---|---|---|---|---|
| USER ADDRESS INFORMATION | | | | | | |
| REGISTREE'S ADDRESS INFORMATION | | TRANSMISSION AS NECESSARY | | TRANSMISSION | TRANSMISSION | |
| STARTING PLACE INPUT INFORMATION | | TRANSMISSION AS NECESSARY | | | | |
| CURRENT POSITION INFORMATION | | TRANSMISSION | | | | |
| USER HOME'S NEAREST STATION INFORMATION | TRANSMISSION | | TRANSMISSION | | | |
| USER'S LAST TRAIN STATION INFORMATION | | | TRANSMISSION | | | |
| REGISTREE HOME'S NEAREST STATION INFORMATION | TRANSMISSION | | TRANSMISSION | | | |
| REGISTREE'S LAST TRAIN STATION INFORMATION | | | | | | |
| CHANGE GUIDANCE SERVER CONNECTION PLACE INFORMATION | CONNECTION | CONNECTION | CONNECTION | | | |
| MAP INFORMATION SERVER CONNECTION PLACE INFORMATION | | | | CONNECTION | | |
| WEATHER INFORMATION SERVER CONNECTION PLACE INFORMATION | | | | | CONNECTION | |

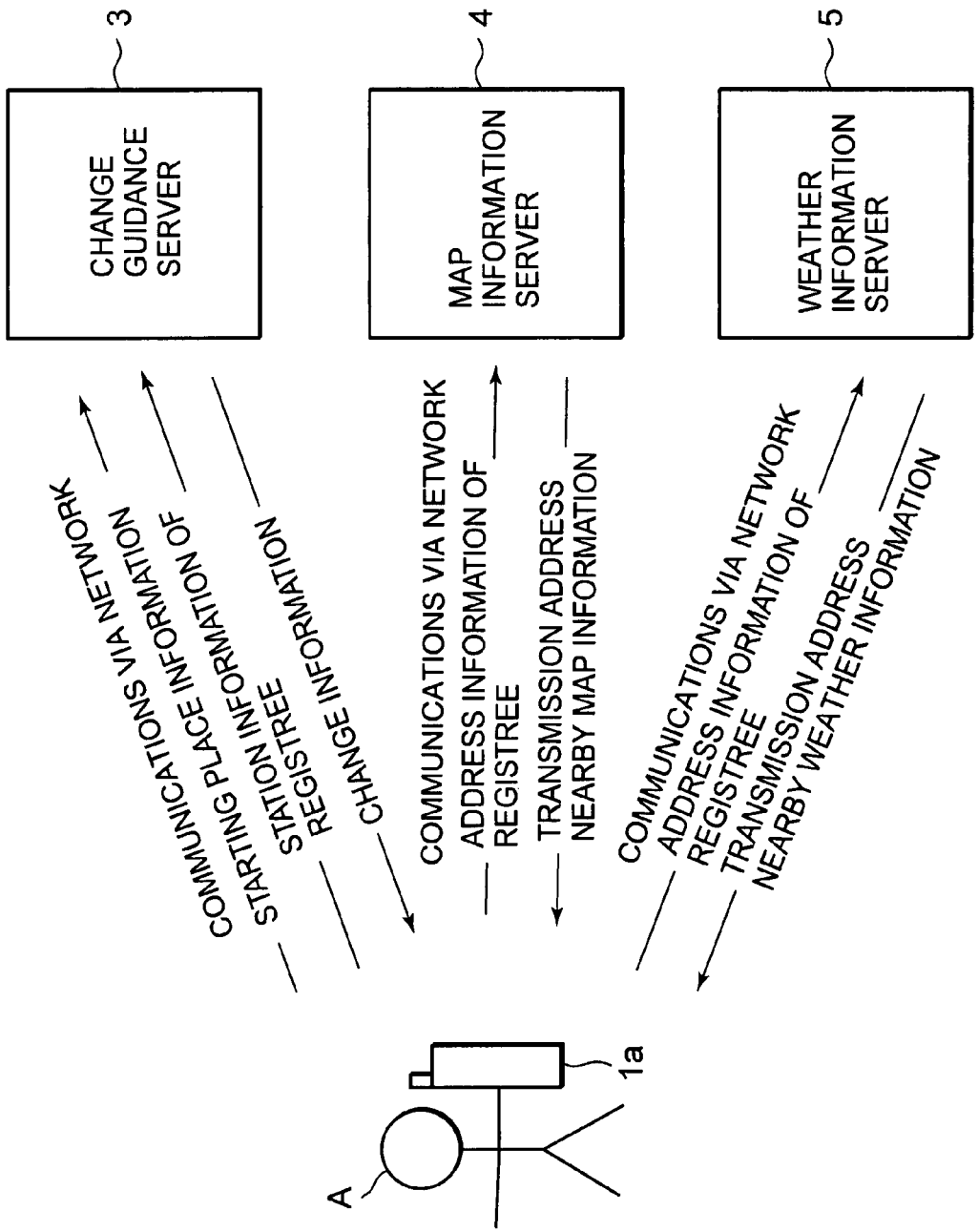

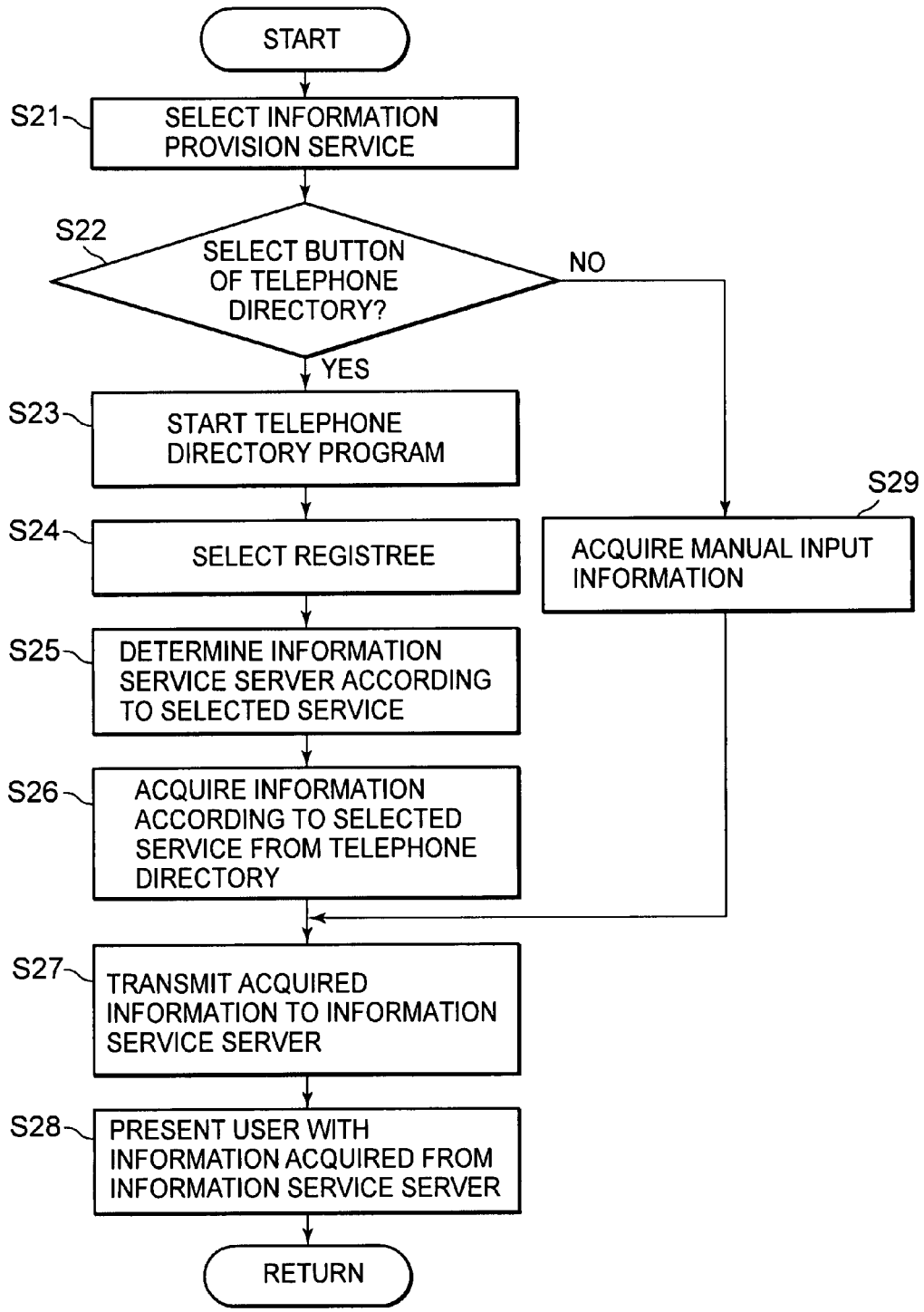

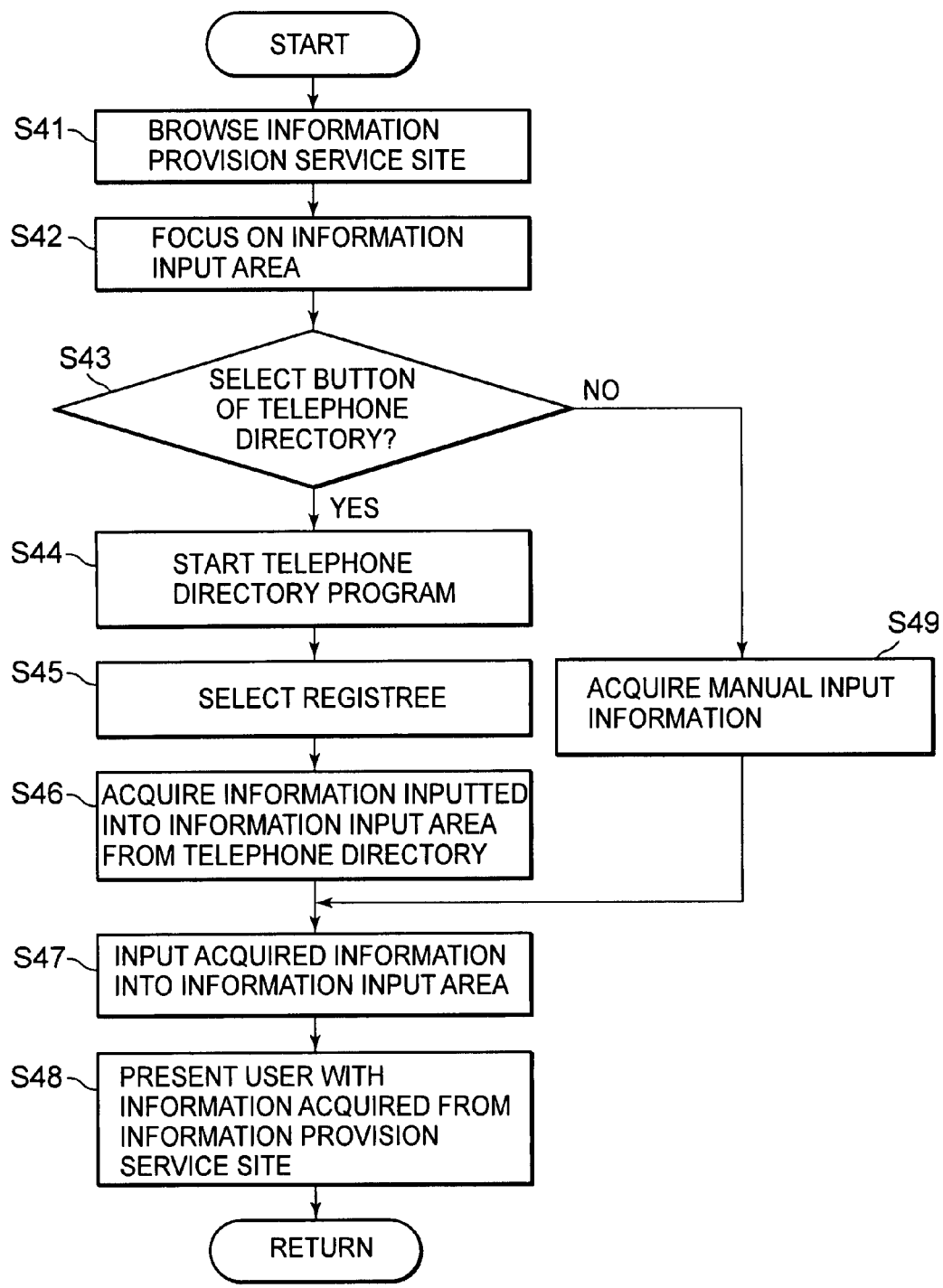

MOBILE COMMUNICATION TERMINAL AND INFORMATION ACQUISITION METHOD FOR POSITION SPECIFICATION INFORMATION

CROSS REFERENCES TO RELATED APPLICATIONS

The present document contains subject matter related to Japanese Patent Application JP 2006-222354 filed in the Japanese Patent Office on Aug. 17, 2006, the entire contents of which are incorporated herein by reference.

BACKGROUND OF THE INVENTION

1. Field of the Invention

The present invention relates to a mobile communication terminal having stored therein a telephone directory (including an address book) etc. in which at least address information is registered, an information acquisition method and an information acquisition program for acquiring desired information from an information service server based on the registered data in the telephone directory.

2. Description of Related Art

In recent years, it has been possible to acquire various information data by means of a mobile communication terminal (for example, a mobile phone terminal) by connecting to networks, such as the Internet. Examples of universal information data used by a lot of users among those that are available by means of a network are, for example, transfer guidance (including last train guidance), weather information, map information, etc.

Further, Japanese Patent Publication (KOKAI) No. 2002-49684 (patent document 1), in particular, in FIG. 3, discloses an information provision system which reduces the time and effort for inputting information required for receiving information from a server. This is accomplished by transmitting the personal information of a mobile terminal user that is registered with the terminal and current position information acquired by a GPS function provided for the mobile terminal through a network to the server which provides information services.

SUMMARY OF THE INVENTION

Incidentally, in order to actually access a server which provides information services over the Internet and to acquire desired information, it is necessary to follow a plurality of steps. The steps include, for example, a step of connecting to the Internet, a step of connecting to the server which provides information service over the Internet, a step of moving to a web page provided with the desired information in a website provided by the server, a step of inputting various information data required in order to acquire the desired information in the web page, etc., thus troublesome work which requires time and effort and is needed. It is noted that, in the case of the information provision system as disclosed in the above-mentioned patent document 1, although the time and effort to input the information is somewhat reduced, the information data transmitted from the terminal side are only the personal information on the user of the terminal and the current position information on the terminal. Thus, information available from the server based on these information data is limited considerably.

The present invention arises in view of such situations, and provides a mobile communication terminal, an information acquisition method, and an information acquisition program with which various information data can be obtained when acquiring information over a network with reduced time and effort to input information and easy and user-friendly operation.

The mobile communication terminal according to an embodiment of the present invention solves the above-mentioned problems by including: an information storage unit; an instruction input unit; an information extraction unit; an information communication unit; an information presentation unit; and a received information presentation control unit. The information storage unit has registered therein a plurality of registration names and position specification information data with which at least a position can be specified are respectively correlated. The instruction input unit acquires instruction input from a user. The information extraction unit extracts, when a desired registration name is selected by the user from the information storage unit through the instruction input unit and when a desired information service is selected, position specification information required for receiving a desired information service from registered information correlated with the selected registration name. The information communication unit transmits the extracted position specification information to an information service provider side which provides the desired information service, and receives the information returned from the information service provider side as a reply to the transmission of the position specification information. The information presentation unit presents information in a form which can be recognized by the user. The received information presentation control unit presents the information presentation unit with the reception information returned from the information service provider side according to the transmission of the position specification information.

The information acquisition method according to an embodiment of the present invention solves the above-mentioned problems by including an extracting step, a transmitting step, a receiving step, and a presenting step. The extracting step is a step of extracting position specification information required for receiving a desired information service from the registered information correlated with the selected registration name when a desired registration name is selected by a user from registration names that are registered such that a plurality of registration names and position specification information data with which at least a position can be specified are correlated respectively and when a desired information service is selected. The transmitting step is a step of transmitting the extracted position specification information to an information service provider side which provides the desired information service. The receiving step is a step of receiving the information returned from the information service provider side as a reply to the transmission of the position specification information. The presenting step is a step of causing an information presentation unit to present the information returned from the information service provider side according to the transmission of the position specification information, the returned information being in a form which can be recognized by the user.

Further, the information acquisition program according to an embodiment of the present invention solves the above-mentioned problems by causing a mobile terminal to function as: an information extraction unit for extracting position specification information required for receiving a desired information service from the registered information correlated with the selected registration name when a desired registration name is selected by an user from registration names that are registered such that a plurality of registration names and position specification information data with which at least a position can be specified are correlated respectively and when a desired information service is selected; a communication control unit for transmitting the position specification information extracted by the information extraction unit to an information service provider side which provides the desired information service, and receiving the information returned from the information service provider side as a reply to the transmission of the position specification information; and a received information presentation control unit for causing an information presentation unit to present the information returned from the information service provider side according to the transmission of the position specification information, the returned information being in a form which can be recognized by the user.

In other words, according to the embodiments of the present invention, the registration names and the position specification information data are correlated and registered with the information storage unit. When the desired registration name is selected by the user and the desired information service is selected, the information extraction unit extracts the position specification information data required for receiving the desired information service. Then, the position specification information data are sent to the information service provider side. In other words, the user may only select the registration name and the information service. Thus, it is not necessary for the user to carry out time-consuming work, such as inputting the position specification information data, when receiving the information service.

BRIEF DESCRIPTION OF THE DRAWINGS

FIG. 6 shows an example of a mapping table for determining an access place for extracting information and a server from the telephone directory according to an information service selected by an user.

FIG. 7 is a schematic representation for explaining specific examples of information sent to the server from the mobile phone terminal and information provided from the server to the mobile phone terminal when the user receives the desired information service.

FIG. 12 is a flow chart showing a flow of a process carried out by a control unit of the mobile phone terminal of the embodiment of the present invention when receiving the information service as described with reference to the second embodiment of the present invention.

FIG. 13 is a flow chart showing a flow of a process carried out by a control unit of the mobile phone terminal of the embodiment of the present invention when receiving the information service as described with reference to the third embodiment of the present invention.

DESCRIPTION OF THE EMBODIMENTS

Hereafter, the preferred embodiments of the present invention will be described with reference to the drawings.

It is noted that, in the embodiments, a mobile phone terminal is mentioned as an example of a mobile communication terminal of the present invention; however, contents described here are merely by way of example. Of course, the present invention is not limited to the example, and it can be applied to various types of mobile information terminals, such as PDAs (Personal Digital Assistants) provided with a communication function.

Outline of First Embodiment of the Invention

The mobile phone terminal of a first embodiment in accordance with the present invention operates as follows. For example, a telephone directory (including address book) stored in an internal memory, etc. is opened. Then, an user A who is an user of the terminal selects a desired registered person (hereinafter referred to as a registree) (for example, registree B) from a plurality of registrees registered with the telephone directory. When the registered contents of the registree B are displayed on a display as an example of an information presentation unit in accordance with the present invention, a menu selection button 13 also is displayed together with telephone directory registration information of the selected registree B as shown in an user interface screen 10 of FIG. 1, for example.

The menu selection button 13 is a button presented at the information presentation unit based on input information about a shift instruction in accordance with the present invention. The menu selection button 13 is, for example, a software key that can be selected by the user A through cursor operation, etc. when using various information services which can be accessed by means of networks, such as the Internet. When the user selects the menu selection button 13, the mobile phone terminal of this embodiment displays on the display a plurality of items respectively correlated with various information services which can be used through the network in a condition that the user A can select the items by way of, for example, a key selection or a cursor operation as shown in the user interface screen 10 of FIG. 2. It is noted that the button for performing menu selection is not necessarily arranged in the user interface screen 10, but a predetermined hardware key on the mobile phone terminal may be assigned as the menu selection button.

Figure 2:
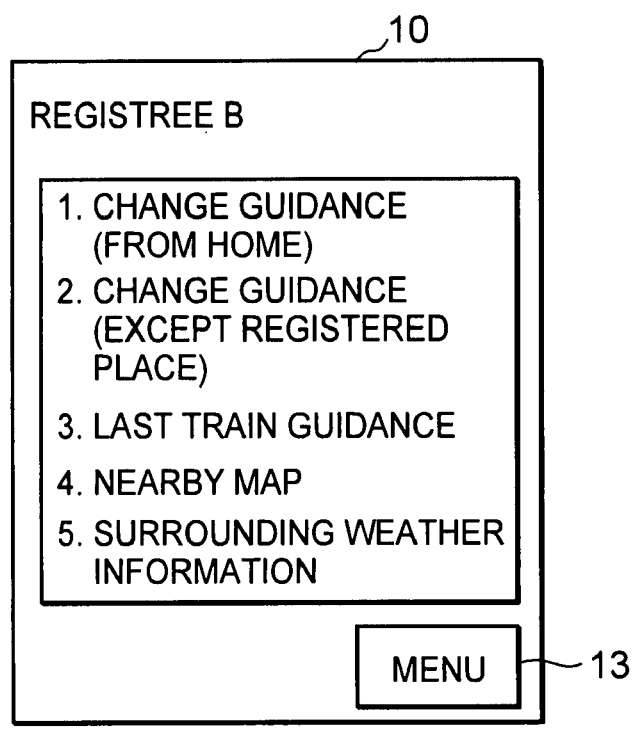
FIG. 2 is a view showing an example of the displayed user interface screen for selecting an information service displayed when the menu selection button is selected at the telephone directory information screen of the registree.

When the user selects the item corresponding to the desired information service from the items shown in FIG. 2, the mobile phone terminal of this embodiment accesses to a server which provides the information service correlated with the selected item, extracts information required in order that the server may provide information services from at least various types of information data registered with the telephone directory, and transmits the extracted information to the server.

Then, if information is provided from the server after transmitting the information extracted from the telephone directory, the mobile phone terminal of the present embodiment displays the information provided from the server on the display.

[Example of Item Displayed by Selecting Menu Selection Button]

Here, in the first embodiment of the present invention, as examples of the items correlated with the information service which can be used through networks, such as the Internet, as shown in FIG. 2, there are presented "1. Change Guidance (from Home)", "2. Change Guidance (except Registered Place)", "3. Last Train Guidance", "4. Nearby Map", and "5. Surrounding Weather Information".

The item "1. Change Guidance (from home)" in FIG. 2 is an item selected by the user A when the user A wants to know the change guidance from the nearest station from home (hereinafter, referred to as "home-nearest station") to the nearest station from an address of the registree B, for example. The item "2. Change Guidance (except Registered Place)" in FIG. 2 is an item selected by the user A in an effort to know the change guidance from the nearest station from an arbitrary place to the nearest station of the registree B. The item "3. Last Train Guidance" in FIG. 2 is an item selected by the user A in an effort to know the last train guidance from the nearest last train station of the address of the registree B to the nearest last train station from the user A's home. Herein, "last train station" means a station at which the last train stops. The item "4. Nearby Map" of FIG. 2 is an item selected by the user A in an effort to know the nearby map of the address of the registree B. The item "5. Surrounding Weather Information" of FIG. 2 is an item selected by the user A in an effort to know the surrounding weather information of the address of the registree B.

Further, it is desirable that the user interface screen, as in the example of FIG. 2 illustrating the information service which can be used through the network periodically, acquires updating information from, for example, a predetermined service management server, etc., and updates it, in order to be able to correspond to the case where a new information service is started and conversely where any of the information services is completed, for example. Alternatively, when the menu selection button 13 is selected, it may be possible to obtain the user interface screen on which new information service always is shown by accessing to the predetermined service management server which provides the user interface screen as shown in FIG. 2.

[Registration Information on Telephone Directory]

Further, in the embodiments of the present invention, registered on the telephone directory of the mobile phone terminal as profile information on the terminal user are contact information, such as a mobile phone number of his/her own terminal, a fixed-line telephone number of his/her home, and an e-mail address. In addition, there also are registered at least position specification information with which each position can be specified, such as addresses of his/her home, a place of work, information on the nearest station from home, and last train station information. Furthermore, registered as telephone directory information on another registree are contact information, such as a mobile phone number, a fixed-line telephone number, an e-mail address, etc. of the registree. In addition, there also are registered at least position specification information, such as addresses of the registree's home, a place of work, etc., information on the nearest station of the address of the registree and the last train station information.

Figure 3:
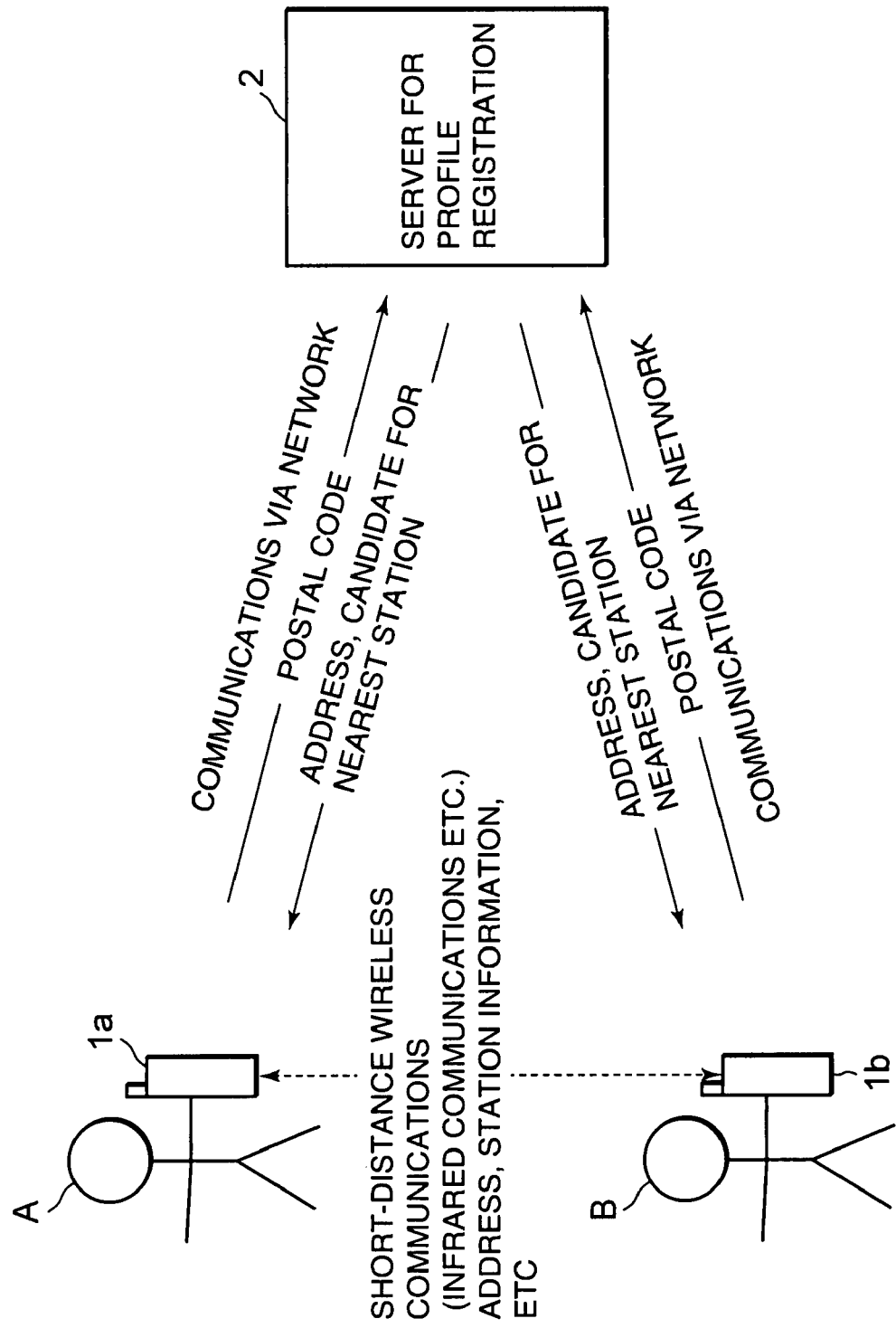
FIG. 3 is a schematic representation for explaining a situation where information is registered with a telephone directory using a predetermined server for profile registration and mobile phone terminals exchange telephone directory information by way of short-distance wireless communications.

Here, in the present embodiment, as shown in FIG. 3, for example, the information registration by means of a predetermined profile registration server 2 and the information registration through information exchange between the mobile phone terminals by way of short-distance wireless communication, such as infrared communication, etc., are possible in the case where the information is registered on the telephone directory of the mobile phone terminal. Of course, the information registration in the telephone directory may be information registration by way of the user's own manual input.

For example, in the case where, by means of the profile registration server 2, the user A registers an exact address and a name of the station as his/her profile information in the telephone directory of a mobile phone terminal 1a, the user A firstly connects to the profile registration server 2 provided on the networks, such as the Internet by means of the mobile phone terminal 1a, and transmits postal code information, for example, on his/her home address to the profile registration server 2. The user A may manually input the postal code to be transmitted to the profile registration server 2 by means of the mobile phone terminal 1a each time or may use one that is beforehand registered with the telephone directory, etc.

Having received the telephone number information from the mobile phone terminal 1a of the user A, the profile registration server 2 finds an address including a name of a prefecture and the extent of a city name and a name of a town and several possible station candidates for the nearest station of the address based on the telephone number information, and returns information on the address and information on the listed candidates for the nearest station to the mobile phone terminal 1a.

Figure 4:
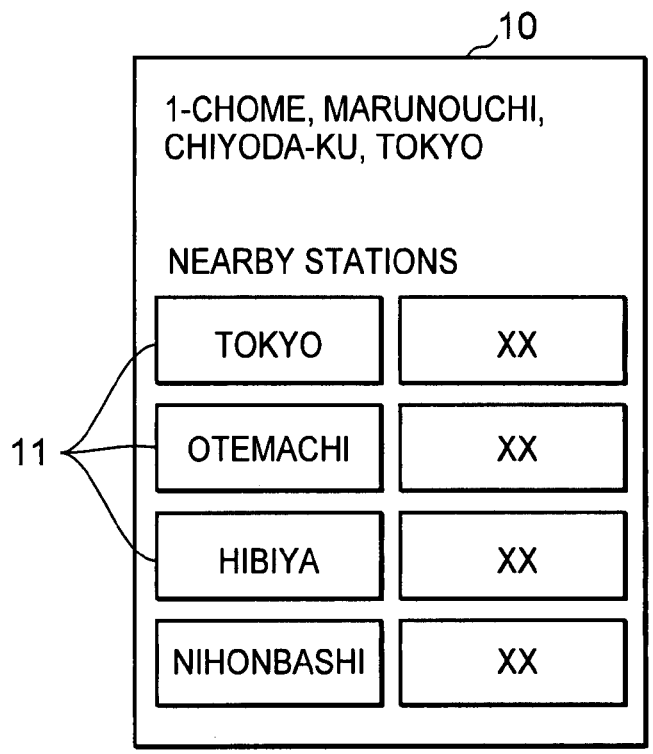
FIG. 4 is a view showing an example of the user interface screen when acquiring candidate information on a nearest station from home from the predetermined server for profile registration, and displaying it on a display.

Having received the information on the address and the information on the name of the nearest the station, the mobile phone terminal 1a displays the information on the display. After the address information is corrected, etc. by the user A as needed, the mobile phone terminal 1a registers the information in a profile column of the telephone directory as home address information of the user A. Further, each candidate for the nearest station is displayed on the user interface screen 10 as a station candidate item 11, as shown in FIG. 4. In the case where the user A selects from these station candidate items 11 a candidate item for the station which can be usually used as the nearest station, the mobile phone terminal 1a, as shown in FIG. 5, displays a selection window 12 for selecting either the nearest station of "usual use" or the nearest station of "use for last train" as the station candidate corresponding to the selected item.

In the selection window 12, when the user A selects, for example, "1. Usual Use" through the key selection and cursor operation (for example), the mobile phone terminal 1a registers station name information thereof on the telephone directory as the nearest station name information (nearest station name information except for use for last train), the nearest station usually being accessible to and from user A's home. On the other hand, in the case where the user A selects "2. Use for Last Train", it registers the station name information on the telephone directory as the name information on the station accessed to and from user A's home at the time of the last train. One for each of the usually used station and the station which can be used at the time of the last train may be registered. Alternatively, a plurality of names of the stations with priorities may be registered.

Figure 5:
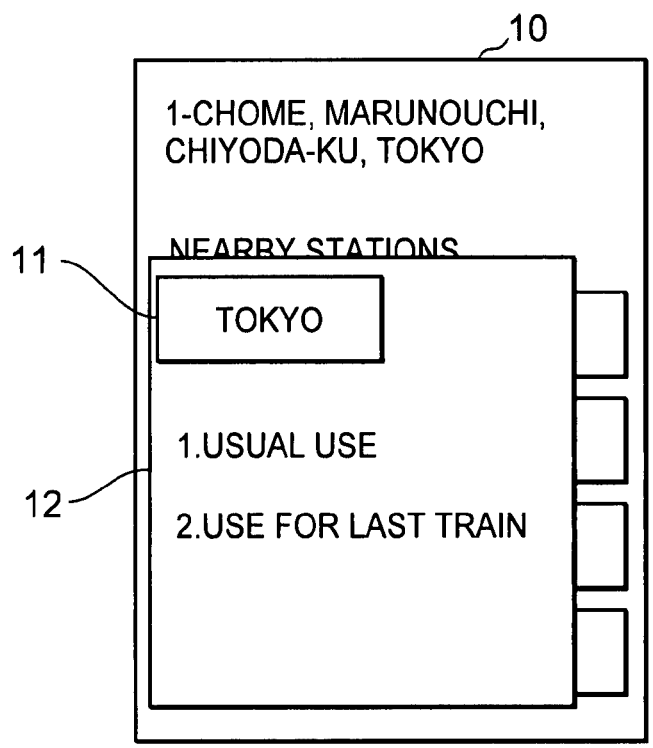
FIG. 5 is a view showing an example of the user interface screen for setting a station selected from candidates for the nearest station as either an usually used station or a station used at the time of the last train.

In other words, as an example, after usage situations in FIG. 5 are each determined with respect to several candidate items 11 for the station of FIG. 4, and when the priorities are given to them and selected by the user A, the mobile phone terminal 1a gives priorities to the information data of the respective station names to be registered in the telephone directory.

Similar procedures are carried out in the case where the profile registration server 2 is used and the user B registers an exact address and the name of the station as his/her own profile information in the telephone directory of a mobile phone terminal 1b.

It is noted that, since the registration with a telephone directory as described above is a procedure for preventing an error of the registration information due to the user's manual input, the profile registration server 2 does not need to manage each user's registration information; but, of course, the profile registration server 2 can manage each user's registration information. Further, according to the present embodiment, since the user side is provided with the plurality of candidates for the station, it becomes unnecessary for the user to search repeatedly for every station.

On the other hand, in the case where the information registration with the telephone directory is carried out, for example, by way of short-distance wireless communications, the user A's profile information registered with the telephone directory of the mobile phone terminal 1a is sent to the mobile phone terminal 1b by way of short-distance wireless communications. In addition, in a similar way, the user B's profile information registered with the telephone directory of the mobile phone terminal 1b is similarly sent to the mobile phone terminal 1a by way of short-distance wireless communications.

In this case, on the mobile phone terminal 1a side, required information, such as the address, the name of the nearest station, the name of the last train station, etc. is taken out of the user B's profile information sent from the mobile phone terminal 1b and is registered on the telephone directory as information for the user B.

Similarly, on the mobile phone terminal 1b side, required information, such as the address, the name of the nearest station, the name of the last train station, etc. is taken out of the user A's profile information sent from the mobile phone terminal 1a and is registered on the telephone directory as information for the user A.

As described above, in the present embodiment, since it is arranged that the mobile phone terminals can exchange the information data in the telephone directory by way of short-distance wireless communications, such as infrared communications, it is not necessary to input the data of the telephone directory by a troublesome manual operation, and thereby it is possible to exchange the information data correctly and simply even if there are a large amount of information data.

[Details of Information Extracted from Telephone Directory in Accordance with Information Service, and Destination of the Information]

The mobile phone terminal of the first embodiment of the present invention is arranged to access to the server which provides the information service correlated with the selection item as described above in the case where the item corresponding to the desired information service is selected by the user from the items shown in FIG. 2, as well as to extract the information needed in order that the server may provide the information service from the telephone directory, to thereby transmit the information to the server.

Figure 1:
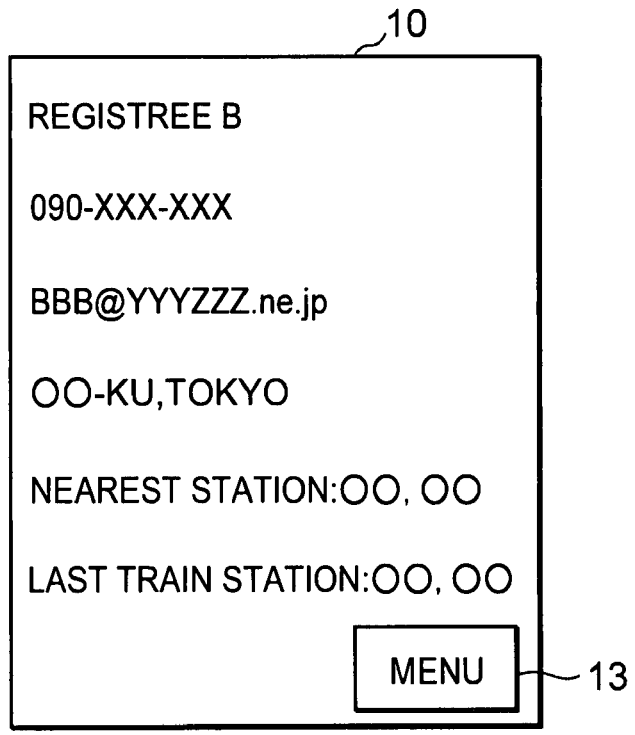
FIG. 1 is a view showing an example of an user interface screen where a menu selection button for selecting a desired information service is displayed at a telephone directory information screen of a registree.

In other words, as the menu selection button 13 is selected on the user interface screen 10 of the telephone directory information in FIG. 1 to shift to the selection screen (as shown in FIG. 2) of the information service, the mobile phone terminal of the present embodiment acquires connection information (for example, an URL for connecting with a desired web page of a website etc.) for connecting with the server which provides the information service matched with the item selected in FIG. 2 based on a mapping table as shown in FIG. 6 as an example, and determines information to be extracted from the telephone directory as the information required in order to receive the information service correlated with the item selected in FIG. 2.

With reference to a particular example, in the case where the item of "1. Change Guidance (from Home)", for example, is selected by the user A from the items shown in FIG. 2, the mobile phone terminal 1a of the present embodiment refers to a mapping table as shown in FIG. 6 to extract connection information for accessing to the server which provides the change guidance information service correlated with the selected item. Further, as information necessary for the server of the change guidance information service to generate change guidance information, the user A's home-nearest station information and the registree B's home-nearest station information are extracted from the information registered with the telephone directory. Then, the mobile phone terminal 1a transmits the user A's home-nearest station information and the registree B's home-nearest station information, which are extracted from the telephone directory, to the change guidance information service server accessed on the basis of the connection information. It is noted that, the user A's home-nearest station and the registree B's home-nearest station that are extracted from the telephone directory may not be limited to one station for one, but a plurality of nearest stations registered in the telephone directory may be extracted. In the case where the information on these plural nearest stations is extracted and transmitted to the server, the server provides a plurality of change guidance information data on the basis of these plural nearest station information data.

Further, for example, in the case where the item of "2. Change Guidance (except Registered Place)" is selected by the user A from the items as shown in FIG. 2, the mobile phone terminal 1a of the present embodiment refers to the mapping table as shown in FIG. 6 to take out the connection information for accessing to the server which provides the change guidance information service corresponding to the selection item. Then, the mobile phone terminal 1a extracts the registree B's home-nearest station information from the information registered with the telephone directory as the information necessary for the server of the change guidance information service to generate the change guidance information, and acquires desired position information manually inputted by the user A or information on a current position positioned by GPS, etc. as information other than the registered place in the telephone directory. Then, the mobile phone terminal 1a transmits the registree B's home-nearest station information extracted from the telephone directory and the desired position information manually inputted by the user A or the information on the current position positioned by GPS, etc. to the change guidance information service server accessed on the basis of the connection information.

Further, for example, in the case where the item of "3. Last Train Guidance" is selected by the user A from the items as shown in FIG. 2, the mobile phone terminal 1*a* of the present embodiment refers to the mapping table as shown in FIG. 6 to take out the connection information for accessing to the server which provides the change guidance information service corresponding to the selection item. In parallel, the mobile phone terminal 1*a* extracts the user A's home-nearest last train station information and the registree B's home-nearest last train station information from the information registered with the telephone directory as the information required in order that the server of the change guidance information service may generate the last train guidance information. Then, the mobile phone terminal 1*a* transmits the user A's home-nearest last train station information and the registree B's home-nearest last train station information extracted from the telephone directory to the change guidance information service server accessed on the basis of the connection information. In addition, as with the case of the change guidance, also in the case of this last train guidance, the user A's last train station and the last train station of the registree B that are extracted from the telephone directory may not be limited to one station for one, but a plurality of last train stations registered in the telephone directory may be extracted. In the case where the information on these plural last train stations is extracted and transmitted to the server, the server provides a plurality of last train guidance information data from these plural last train station information data.

Further, for example, in the case where the item of "4. Nearby Map" is selected by the user A from the items as shown in FIG. 2, the mobile phone terminal 1*a* of the present embodiment refers to the mapping table as shown in FIG. 6 to take out the connection information for accessing to the server which provides the map information service corresponding to the selection item. The mobile phone terminal 1*a* extracts the information on a home address of the registree B from the information registered with the telephone directory as the information required in order that the server of the map information service may generate map information, and transmits the registree B's home address information extracted from the telephone directory to the map information service server accessed on the basis of the connection information.

Furthermore, for example, in the case of where the item of "5. Surrounding Weather Information" is selected by the user A from the items as shown in FIG. 2, the mobile phone terminal 1*a* of the present embodiment refers to the mapping table as shown in FIG. 6 to take out the connection information for accessing to the server which provides the weather information service corresponding to the selection item. Then, the mobile phone terminal 1*a* extracts the information on the home address of the registree B from the information registered with the telephone directory as the information required in order that the server of the weather information service may generate the weather information, and transmits the registree B's home address information extracted from the telephone directory to the weather information service server accessed on the basis of the connection information.

In other words, in the case where the item of "1. Change Guidance (from Home)", the item of "2. Change Guidance (except Registered Place)", or the item of "3. Last Train Guidance" is selected from the items of FIG. 2, the mobile phone terminal 1*a* of the present embodiment accesses, as shown in FIG. 7, to a change guidance server 3 which provides the information service of the change guidance or the last train guidance. Then, the mobile phone terminal 1*a* transmits starting place information (information on the user A's home-nearest station or arbitrary places) required for the change guidance and the station information of the registree B to the change guidance server 3, to thereby acquire the change guidance information and the last train guidance information from the change guidance server 3. It is noted that, although the time etc., in the change guidance is set as the current time by default, it is also possible to set an arbitrary time.

Still further, in the case where the item of "4. Nearby Map" is selected from the items of FIG. 2, the mobile phone terminal 1*a* of the present embodiment accesses to a map information server 4 which provides the information service of the nearby map guidance. Then, the mobile phone terminal 1*a* transmits the registree B's address information required for the map information guidance to the map information server 4, as shown in FIG. 7, to thereby acquire home nearby map information of the registree B from the map information server 4.

Similarly, in the case where the item of "5. Surrounding Weather Information" is selected from the items of FIG. 2, the mobile phone terminal 1*a* of the present embodiment accesses a weather information server 5 which provides the information service of the surrounding weather guidance. Then, the mobile phone terminal 1*a* transmits the address information of the registree B required for the surrounding weather guidance to the weather information server 5, as shown in FIG. 7, to thereby acquire the weather information around the home of the registree B from the weather information server 5.

It is noted that, although the example of FIG. 7 illustrates the change guidance server 3, the map information server 4, and the weather information server 5 which are provided separately, these servers may be combined into a single server. In this case, a request showing which information service he/she wants to receive in addition to the information on the name of the station or the information on the address is sent from the mobile phone terminal to the server.

[Example of Selecting Registree from Telephone Directory after Selecting Information Service]

In the first embodiment as described above, the example illustrates that a desired registree is selected from the telephone directory, and the menu selection button 13 is selected in the user interface screen 10 of FIG. 1 where the contents of registration of the registree are displayed, whereby the selection screen for each of the information service items in FIG. 2 is displayed to select the desired information service item in the screen of FIG. 2. However, like the following second embodiment, the present invention may be arranged such that the items corresponding to the respective information services is first made selectable, and after an item corresponding to the desired information service is selected from them, the desired registree is selected from the telephone directory.

Figure 8:
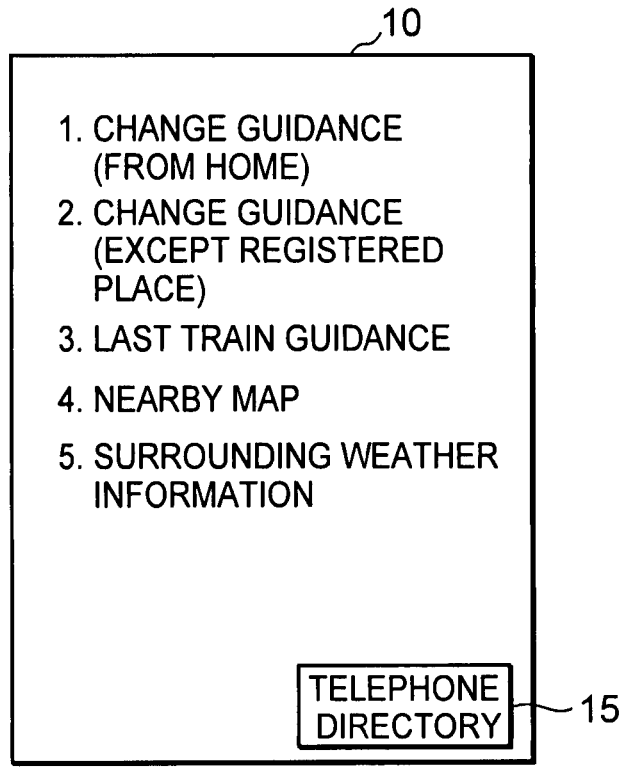
FIG. 8 is a view showing an example of the user interface screen where a telephone directory selection button selected when information is taken out of the telephone directory is displayed on a screen for selecting the information service.

In the case of the second embodiment of the present invention, when displaying an user interface screen for selecting the item of each information service on the display, the user A's mobile phone terminal 1*a* also displays a telephone directory selection button 15, which is a button presented to an information presentation unit in the screen 10 based on the name selection input information in accordance with the present invention, as shown in FIG. 8. It is noted that, the button for performing telephone directory selection is not necessarily arranged in the user interface screen 10, and the telephone directory selection button may be assigned to a predetermined hardware key on the mobile phone terminal.

Here, in the case where the item of "1. Change Guidance (from Home)", for example, is selected by the user A in the user interface screen 10 of FIG. 8 and the telephone directory selection button 15 is selected further, the mobile phone terminal 1a of the present embodiment displays the telephone directory on the display.

Next, when the user A selects, for example, the registree B from the telephone directory, the mobile phone terminal 1a refers to, for example, the mapping table as shown in FIG. 6 to take out the connection information for accessing to the change guidance server 3 which provides the change guidance information service correlated with the item of the selected information service. Then, the mobile phone terminal 1a extracts the home-nearest station information of the user A and the home-nearest station information of the registree B from the information registered with the telephone directory as the information required in order for the change guidance server 3 to generate the change guidance information.

Then, the mobile phone terminal 1a accesses to the change guidance server 3 on the basis of the connection information, and transmits the user A's home-nearest station information and the registree B's home-nearest station information extracted from the telephone directory to the change guidance server 3.

[Example of Selecting Registree in Telephone Directory Via Information Service Page]

As another example of selecting the registree from the telephone directory and performing the information input after selecting the information service, like a third embodiment of the present invention, it is possible to extract the station name information, the address information, etc. of the desired registree from the telephone directory and input them, for example, over a page of a website which provides information services in the case where it is required to input the station name information, the address information, etc.

Figure 9:
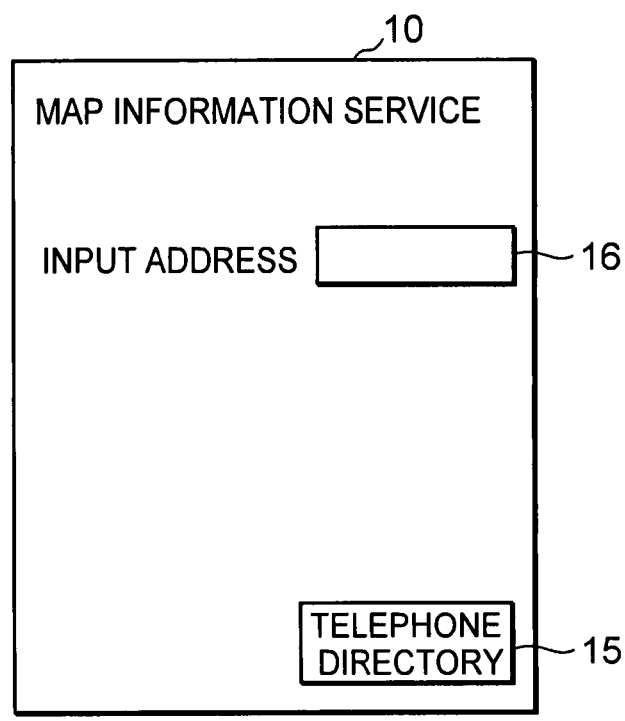
FIG. 9 is a view showing an example of the user interface screen where the telephone directory selection button selected when the information is taken out of the telephone directory is displayed on a page screen of a website which provides information services.

As an example of selecting an information service, in the case where a website which provides map information services is already accessed, the mobile phone terminal of the present embodiment provides the telephone directory selection button 15 in the user interface screen 10 which displays the web page of the map information service, as shown in FIG. 9. It is noted that, the button for performing the telephone directory selection is not necessarily arranged in the user interface screen 10, and it is possible to assign the telephone directory selection button to a predetermined hardware key on the mobile phone terminal.

Here, in the user interface screen 10 of FIG. 9, when the telephone directory selection button 15 is selected, for example, in a condition that an information input area 16 for entering the address information is focused or highlighted, the mobile phone terminal 1a of the present embodiment displays the telephone directory on the display.

Next, if the user A selects, for example, the registree B from the telephone directory, the mobile phone terminal 1a extracts the information on the home address of the registree B from the telephone directory, and inputs it into the information input area 16.

Then, the mobile phone terminal 1a transmits the address information of the registree B inputted into the information input area 16 to the website of the map information service.

[Example Where Server Side Requests Information Required for Providing Information from Mobile Phone Terminal]

In the first and second embodiments as described above, in the case where the item corresponding to the desired information service is selected from the items as shown in FIG. 2 or FIG. 8, the examples illustrate that the mobile phone terminal extracts the information necessary for the server corresponding to the selection item to provide the information, from the telephone directory by itself on the basis of the mapping table of FIG. 6, and transmits it to the server. However, as another example, in the case where the desired item is selected from the items of FIG. 2 or FIG. 8, it may be arranged that firstly the mobile phone terminal accesses to the server corresponding to the item, the server having been accessed by the mobile phone terminal requests the information required when providing the information from the mobile phone terminal side, and the mobile phone terminal having received the request extracts the information according to the request from the telephone directory to return it to the server.

[Schematic Internal Structure of Mobile Phone Terminal]

Figure 10:
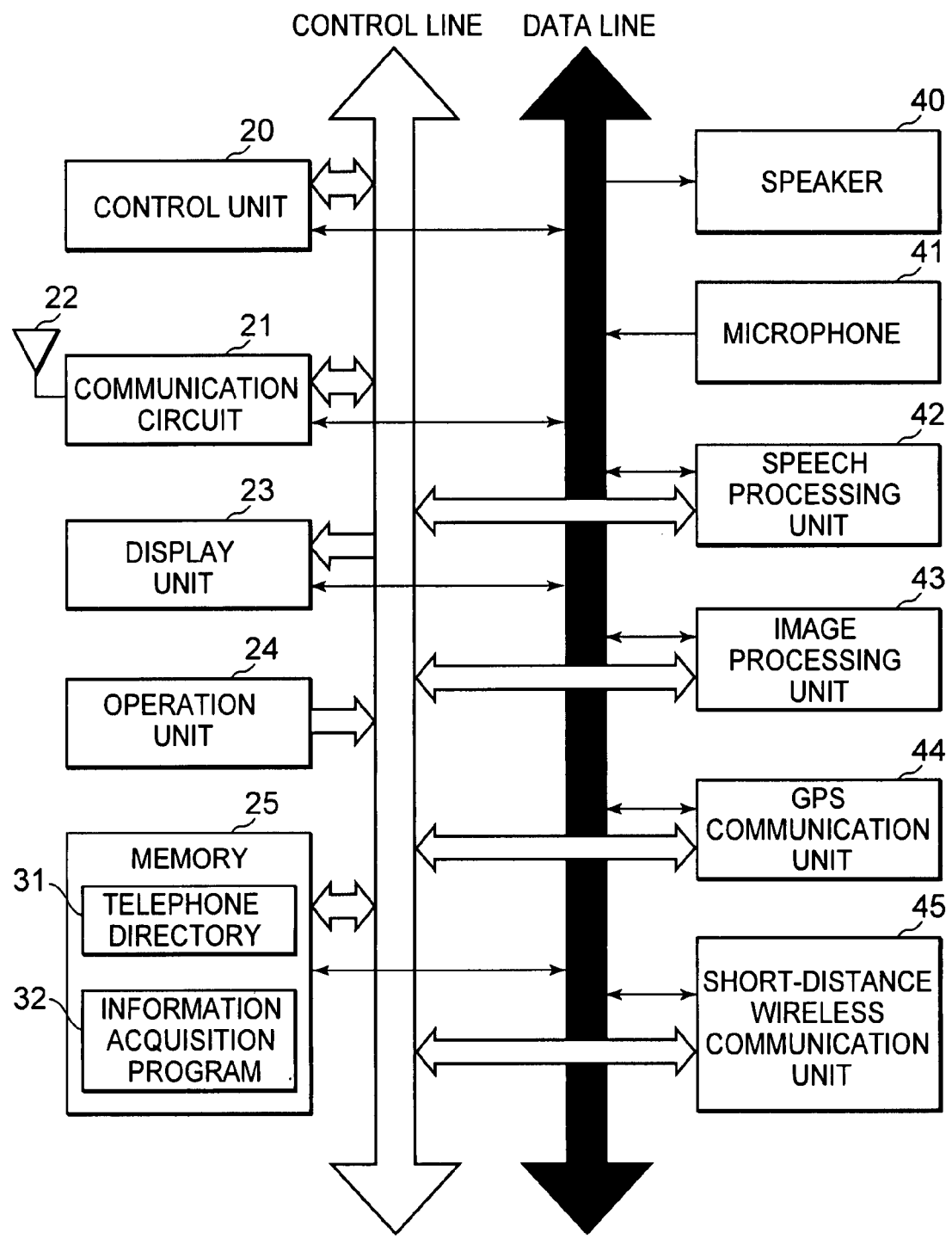
FIG. 10 is a block diagram showing a schematic internal structure of the mobile phone terminal according to the embodiments of the present invention.

FIG. 10 shows a schematic internal structure of the mobile phone terminal according to the embodiments of the present invention.

In FIG. 10, a communication antenna 22 is, for example, a built-in antenna, and it transmits and receives a signal wave for a telephone call or packet communication. A communication circuit 21 performs frequency conversion, modulation, demodulation, etc. for a transmission/reception signal. It is noted that, the data transmitted and received by way of packet communications may be mail data, image data (such as video or a still image), voice data, HTML (Hyper Text Markup Language) data, program data, and other various data. Here, in the case where the reception data via the communication antenna 22 and the communication circuit 21 are telephone call voice data, the telephone call voice data are sent to a speech processing unit 42 through a data line. Other reception data are once sent to a control unit 20 to be processed, and then the data are sent to each part from the control unit 20 as needed.

When the reception data of the telephone call sound are supplied via the communication antenna 22 and the communication circuit 21, the speech processing unit 42 decrypts the reception data of the telephone call voice, and sends the decrypted telephone call voice data to a speaker 40 through the data line.

A speaker 40 is a speaker for receiving a call or a speaker for ringing (ring tone), music playback, and an alarm sound output provided for the mobile phone terminal, includes a digital/analog converter and an amplifier, amplifies and digital/analog converts the data of the telephone call voice, ring tone sound, and reproduced music, and then outputs them.

A microphone 41 is a microphone for transmission and includes an analog/digital converter and an amplifier. After a telephone call voice signal inputted through this microphone 41 is amplified to a predetermined level with the amplifier, the signal is converted into digital voice data by the analog/digital converter. After being sent to the speech processing unit 42 through the data line and encoded, it is sent to the communication circuit 21 through the data line, subjected to various processes, such as modulation and frequency conversion, and transmitted via the communication antenna 22.

An operation unit 24 is constituted by 12 keys, an arrow key, a speak key, a clear key, a stop key/power supply key, other key operation devices provided on a casing of the mobile phone terminal of the present embodiment, and an operation signal generator for generating an operation signal in accordance with the operation of these operation devices. The user operates this operation unit 24 and issues an instruction to call and receive a call for communications, prepare a mail, transmit and receive the mail, connect with the Internet, select a menu, etc.

A display unit 23 is constituted by a display of a liquid crystal, etc. provided on the casing of the mobile phone terminal of the present embodiment and a display drive circuit for driving the display. The display drive circuit drives the display on the basis of an image signal supplied from an image processing unit 43, whereby an image, a character, etc. are displayed on the display. It is noted that, although the information presentation unit in accordance with the present invention is equivalent to the display unit 23, the information presentation by way of the audio output from the speaker 40, etc. also is included in the present invention.

The image processing unit 43 processes the image displayed on the display unit 23. Further, the image processing unit 43 performs the displaying various types of user interface screens, displaying a web page, etc. under the control of the control unit 20.

A GPS unit 44 is constituted by a GPS antenna and a GPS control unit. The GPS antenna receives an electric wave transmitted by a geodetic satellite in GPS. The GPS control unit finds the latitude and the longitude of the current position of the terminal itself on the basis of the received electric wave through the GPS antenna. The GPS data (information showing the latitude and the longitude) obtained by this GPS unit 44 is sent to the control unit 20, whereby the control unit 20 knows its own current position.

A short-distance wireless communication unit 45 is constituted by a short-distance wireless communication antenna and a short-distance wireless communication control unit. The short-distance wireless communication antenna, for example, is a device for performing short-distance wireless communications by the so-called Bluetooth (BlueTooth: registered trademark) system, the so-called UWB (Ultra Wide Band) system, etc., and the short-distance wireless communication control unit generally controls short-distance wireless communications and exchanges data with the control unit 20.

A memory 25 includes a ROM (Read Only Memory) and a RAM (Random Access Memory). The ROM stores therein an OS (Operating System), a control program and various types of initial set-up values with which the control unit 20 controls each part, font data, various dictionary data, an information acquisition program code 32 and a telephone directory application for performing and controlling the function related to the information acquisition from the information service according to the present embodiment, as well as other various types of application programs installed in a general mobile phone terminal, identification information (ID) on the mobile phone terminal, etc. This ROM may include a rewritable ROM such as a so-called NAND type flash memory. The rewritable ROM also can store therein the registration data of the telephone directory 31 in accordance with the embodiments of the present invention as described above, mail data, as well as schedule data, memo pad data, image data, music data, the application program code downloaded, etc., and various types of set-up values, etc. The RAM stores at any time data as workspace when the control unit 20 performing various types of data processes.

The control unit 20 carries out communication control in the communication circuit 21, display control of the display, the writing/read-out control of the memory, various controls of speech processing, image processing, etc., communication control in the short-distance wireless communications, and positioning control in GPS as well as control of each component and various operation processes of the mobile phone terminal. The control unit 20 executes functions relevant to the information acquisition from the information service by way of execution of the information acquisition program in accordance with the present embodiment. The functions include those of at least the information extraction unit, the received information presentation control unit, a registered information and shift instruction input presentation control unit, a service menu item presentation control unit, an input area and name selection input presentation control unit, the communication control unit, etc. according to the present invention.

In addition, although not shown in FIG. 10, the mobile phone terminal of the present invention is also provided with various components provided for a common mobile phone terminal. The components include, for example, a camera unit for taking an image, an electronic wallet function unit for treating so-called electronic money, a clock unit for generating information, such as time, date, month, year etc., or measuring time, a memory interface unit to which an external memory is connected, a cable connector to which an external cable is connected, a LED (light emitting diode) and its driver unit for lighting keys and an incoming call light, etc., a vibrator and its driver unit, a battery for supplying power to each part, a power management IC unit for controlling the power, and the like.

[Processing Flow of First Preferred Embodiment]

As described above for the first embodiment, FIG. 11 shows a flow of processing carried out by the control unit 20 of the mobile phone terminal according to the embodiment of the present invention when receiving the information service.

Figure 11:
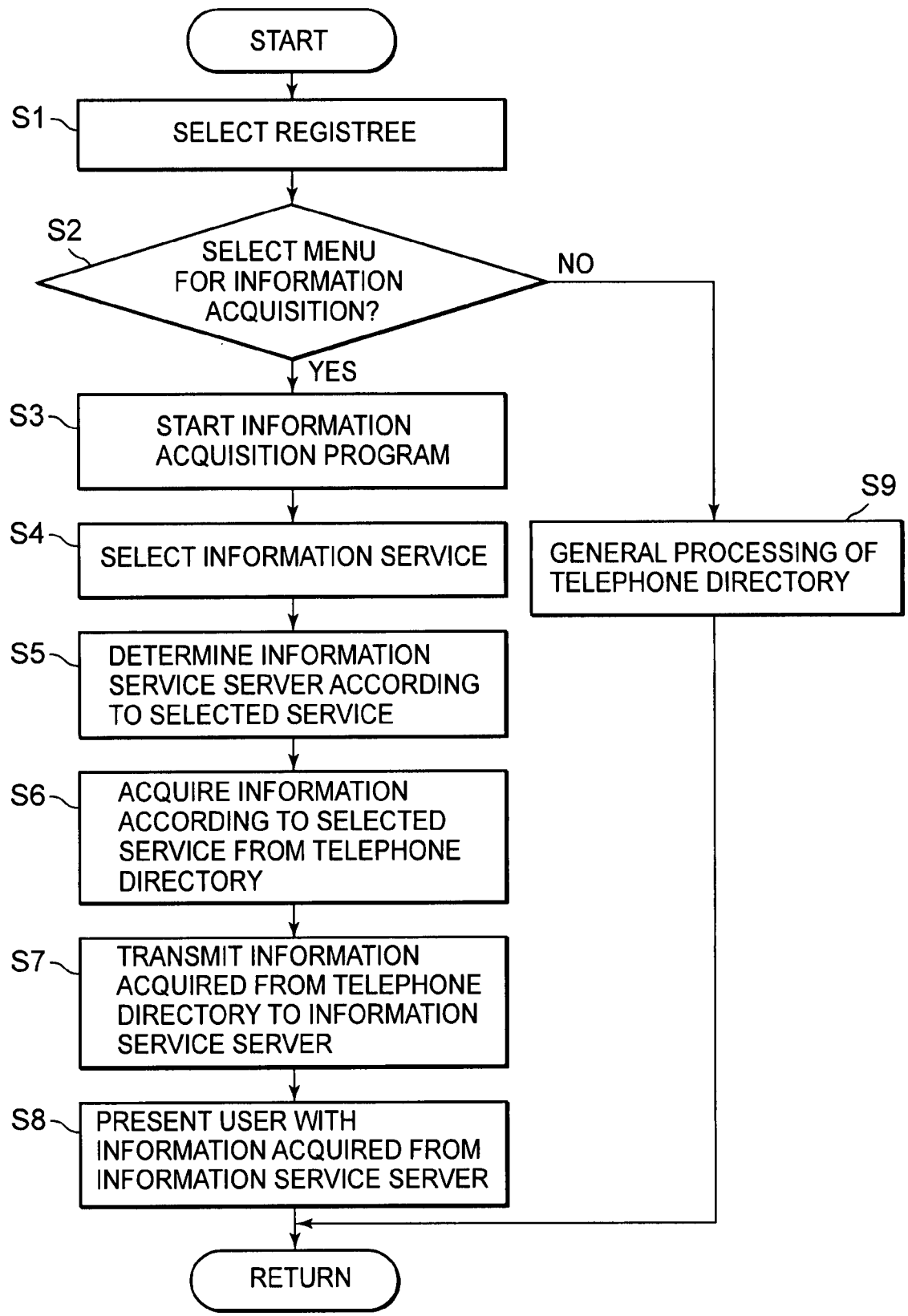
FIG. 11 is a flow chart showing a flow of a process carried out by a control unit of the mobile phone terminal of the embodiment of the present invention when receiving the information service as described with reference to the first embodiment of the present invention.

In FIG. 11, when the telephone directory application has started and the desired registree is selected from the telephone directory in step S1, the control unit 20 displays the menu selection button 13 for information acquisition, as described above, on the user interface screen 10, which displays the selected contents of the telephone directory registration of the registree on the screen of the display unit 23, and moves the process to step S2.

When the process is moved to step S2, the control unit 20 determines whether or not the menu selection button 13 is selected in the user interface screen 10 by way of the operation input through the operation unit 24 by the user (user). Then, the control unit 20 moves the process to step S3, where it determines that the menu selection button 13 is selected in the step S2. On the other hand, as the processing in step S9, it carries out general processing in the telephone directory application while the menu selection button 13 is not selected.

As the menu selection button 13 is selected in step S2 as described above, the process moves to step S3, then the control unit 20 starts the information acquisition program according to the embodiment of the present invention, and displays the user interface screen for selecting the information service as shown in FIG. 2 on the screen of the display unit 23. In step S4, when the item is selected from the items each correlated with the information services as shown in FIG. 2 by way of the operation input through the operation unit 24 by the user, the control unit 20 moves the process to step S5.

As the process moves to step S5, the control unit 20 determines the server which provides the information service correlated with the item selected by the user, for example, on the basis of the above-mentioned mapping table of the FIG. 6 that is created by the information acquisition program of the present embodiment, and acquires the information for connecting to the server.

Further, as the process in step S6, the control unit 20 extracts the information required for receiving the information service corresponding to the item selected by the user from the telephone directory registration information of the registree selected in step S1 as described above.

Further, as the process in step S7, the control unit 20 transmits the information extracted from the telephone directory in step S6 to the server determined in step S5 as descried above.

Then, as the process in step S8, the control unit 20 displays the information returned from the server, i.e., information acquired by service provision, on the screen of the display unit 23 according to the transmission of the information on the registree, shows it to the user, and then returns the process to the start.

[Processing Flow of Second Embodiment]

As described above for the second preferred embodiment, FIG. 12 shows a flow of processing carried out by the control unit 20 of the mobile phone terminal according to the embodiment of the present invention when receiving the information service.

In FIG. 12, when the information acquisition program according to the embodiment of the present invention has started and when the user interface screen 10 where each of the items and the telephone directory selection button 15 for selecting the information services as shown in FIG. 8 is displayed on the screen of the display unit 23, the control unit 20 moves the process to step S22 in the case where the item corresponding to the desired information service is selected from the user interface screen 10 by way of the operation input through the operation unit 24 by the user in step S21.

As the process moves to step S22, the control unit 20 determines whether or not the telephone directory selection button 15 is selected in the user interface screen 10 by way of the operation input through the operation unit 24 by the user. Then, the control unit 20 moves the process to step S23, where it determines that the telephone directory selection button 15 is selected in step S22. On the other hand, it returns the process to step S21 while the telephone directory selection button 15 is not selected.

As the telephone directory selection button 15 is selected in step S22, the process moves to step S23, then the control unit 20 starts the telephone directory application. Subsequently, as the process in step S24, if the desired registree is selected from the telephone directory by way of the operation input through the operation unit 24 by the user, the process moves to step S25.

As the process moves to step S25, the control unit 20 determines the server which is providing the information service correlated with the item selected by the user in step S21 based on the conversion table of the FIG. 6, which is created by the information acquisition program of the embodiment as described above, and acquires the information for connecting to the server.

Further, as the process in step S26, the control unit 20 extracts the information required for receiving the information service corresponding to the item selected by the user from the telephone directory registration information of the registree selected in step S24 as described above.

Further, as the process in step S27, the control unit 20 transmits the information extracted from the telephone directory in step S26 to the server that is determined in step S25.

Then, as the process in step S28, the control unit 20 displays the information returned from the server, i.e., information acquired by service provision, on the screen of the display unit 23 in accordance with the transmission of the information on the registree, shows it to the user, and then returns the process to the start.

[Processing Flow of Third Embodiment]

As described above for the third embodiment, FIG. 13 shows a flow of processing carried out by the control unit 20 of the mobile phone terminal according to the embodiment of the present invention in the case where the registree is selected from the telephone directory during browsing of the website which provides the information service and the information input is carried out.

In FIG. 13, the control unit 20 has accessed the website which provides the desired information service in step S41, and when the page of the website as shown in FIG. 9 is browsed by the user, the process moves to step S43 if the information input area 16 in the web page is focused or highlighted in step S42.

As the process moves to step S43, as shown in FIG. 9, the control unit 20 displays the telephone directory selection button 15 on the user interface screen 10 of the web page and determines whether or not the telephone directory selection button 15 of the user interface screen 10 is selected by way of the operation input to the operation unit 24 from the user. Then, the control unit 20 moves the process to step S44, where it determines that the telephone directory selection button 15 is selected in the step S43. On the other hand, as the process in step S49, a situation is provided where the desired information can be inputted into the information input area 16 by way of the operation input to the operation unit 24 from the user while the telephone directory selection button 15 is not selected. When the information is manually inputted into the information input area 16 in such a situation, the control unit 20 moves the process to step S47.

As the telephone directory selection button 15 is selected in step S43 to move the process to step S44, the control unit 20 starts the telephone directory application. Subsequently, when the desired registree is selected from the telephone directory by way of the operation input through the operation unit 24 by the user as the process in step S45, the process moves to step S46.

As the process moves to step S46, the control unit 20 acquires the information to be inputted into the information input area 16 from the telephone directory.

Next, as the process moves to step S47, the control unit 20 inputs the information acquired from the telephone directory in step S46 or the information manually inputted in step S49 into the information input area 16. Further, the information inputted into the information input area 16 is transmitted to the website.

Then, as the process in step S48, the control unit 20 displays the information returned from the website, i.e., information acquired by service provision, on the screen of the display unit 23 in accordance with the transmission of the information inputted into the information input area 16, shows it to the user, and then returns the process to the start.

CONCLUSION

As described above, according to the present embodiments, when accessing to the server and website which provide various information services, such as the change guidance, the last train guidance, the map guidance, and the weather information guidance through a predetermined network, such as the Internet, to receive the desired information service, the information that is required for receiving the information service is arranged so as to be extracted from the telephone directory of the mobile phone terminal and transmitted. Therefore, according to the present embodiments, there is substantially no need to manually input the information for receiving the desired information service, and the user can acquire various information data with an easy and user-friendly operation.

Further, according to the present embodiments, since it is arranged that the information on a plurality of nearest stations or the last train station can also be transmitted to the server or the website, it is possible to acquire collectively a plurality of change guidance services by means of a plurality of those station names and the last train guidance information, and it is not necessary to search for every station, thus considerably reducing the user's time and effort.

It is noted that the description of each embodiment is an example of the present invention. Therefore, the present invention is not limited to the embodiments as described above, and it can of course be modified according to a design, etc. as far as it is within the range of the technical ideas of the present invention.

According to the present invention, it is also possible to acquire the information on the change guidance to a particular store, a particular leisure spot, etc., or the surrounding weather, a map, etc. by accessing the server and website which provide the information on the particular store, the particular leisure spot, etc. for example, extracting the address information and the nearest station information in the telephone directory from a search menu which operates on a web browser and is substantially the same as that of the embodiments and transmitting them.

It should be understood by those skilled in the art that various modifications, combinations, subcombinations and alterations may occur depending on design requirements and other factors insofar as they are within the scope of the appended claims or the equivalents thereof.

What is claimed is:

1. A mobile communication terminal comprising:
    an information storage unit having registered therein a plurality of registration names and position specification information data with which at least a position can be specified, which are correlated respectively;
    an instruction input unit for acquiring instruction input from a user;
    an information extraction unit for extracting, when a desired registration name is selected by the user from the information storage unit through the instruction input unit and when a desired information service is selected, position specification information required for receiving the desired information service from the registration information data correlated with the selected registration name and registered in the information storage unit;
    an information communication unit for transmitting the position specification information extracted by the information extraction unit to an information service provider side which provides the desired information service, and receiving the information returned from the information service provider side as a reply to the transmission of the position specification information;
    an information presentation unit for presenting information in a form which can be recognized by the user; and
    a received information presentation control unit for presenting the information presentation unit with the information returned from the information service provider side and received by the information reception unit according to the transmission of the position specification information.

2. The mobile communication terminal according to claim 1, further comprising:
    a service menu item presentation control unit for presenting the information presentation unit with a service menu item for the user to select a desired information service from a plurality of information services, and
    a registration information and shift instruction input presentation control unit for causing the information presentation unit to present the registration information which is correlated with the selected registration name and registered with the information storage unit, when the desired registration name is selected by the user through the instruction input unit from the registration names registered with the information storage unit, as well as shift instruction input information for the user to input and issue an instruction to shift the information presentation unit into a situation where the service menu item is presented through the instruction input unit.

3. The mobile communication terminal according to claim 2, wherein when the desired service menu item is selected by the user through the instruction input unit from the service menu items presented at the information presentation unit, the information extraction unit extracts from the information storage unit the position specification information required for receiving the information service in accordance with the selected service menu item.

4. The mobile communication terminal according to claim 1, further comprising:
    an input area and name selection input presentation control unit for causing the information presentation unit to present input area information for inputting information required for receiving the desired information service and name selection input information for the user to select the desired registration name registered with the information storage unit through the instruction input unit.

5. The mobile communication terminal according to claim 4, wherein the information communication unit transmits the position specification information extracted by the information extraction unit as the input information into the input area, to the information service provider side which provides the desired information service.

6. The mobile communication terminal according to claim 1, wherein:
    the information storage unit has registered therein a plurality of position specification information data each of which is correlated with one registration name,
    the information extraction unit extracts a plurality of position registration information data with respect to the selected registration name,
    the information communication unit transmits the plurality of position specification information data extracted by the information extraction unit, to the information service provider side which provides the desired information service, and
    the received information presentation control unit causes the information presentation unit to present a plurality of reception information data returned from the information service provider side according to the transmission of the plurality of position specification information data.

7. The mobile communication terminal according to claim 1, wherein:
    the information storage unit has registered therein the registration names of the user and a plurality of other registrees and station name information which specifies nearest stations and/or last train stations of at least the user and each of the other registrees which are respectively correlated, and
    the information communication unit transmits the station name information to the information service provider side which provides change guidance information services.

8. The mobile communication terminal according to claim 1, wherein:
- the information storage unit has registered therein the registration names of the user and a plurality of other registrees and address information specifying at least addresses of the user and each of the other registrees, which are respectively correlated, and
- the information communication unit transmits the address information to the information service provider side which provides map information services.

9. The mobile communication terminal according to claim 1, wherein:
- the information storage unit has registered therein the registration names of the user and a plurality of other registrees and address information which specifies at least addresses of the user and each of the other registrees, which are respectively correlated, and
- the information communication unit transmits the address information to the information service provider side which provides weather information services.

10. An information acquisition method, comprising the steps of:
- extracting, when a desired registration name is selected by a user through an information extraction unit from an information storage unit where a plurality of registration names and position specification information data with which at least a position can be specified are correlated respectively and registered and when a desired information service is selected, position specification information required for receiving a desired information service using the information extraction unit from the registration information data registered in the information storage unit and correlated to the selected registration name;
- transmitting the position specification information extracted by the information extraction unit to an information service provider side which provides the desired information service through an information communication unit;
- receiving, through the information communication unit, the information returned from the information service provider side as a reply to the transmission of the position specification information; and
- causing a received information presentation control unit to present, on an information presentation unit, the information returned from the information service provider side and received by the information reception unit in accordance with the transmission of the position specification information, the returned information being in a form which can be recognized by the user.

* * * * *